United States Patent [19]

Itoh et al.

[11] Patent Number: 4,753,133
[45] Date of Patent: * Jun. 28, 1988

[54] CONTROL SYSTEM FOR CONTINUOUSLY VARIABLE TRANSMISSION IN MOTOR VEHICLE

[75] Inventors: Hiroshi Itoh; Mitsuru Takada, both of Toyota, Japan

[73] Assignee: Toyota Jidosha Kabushiki Kaisha, Toyota, Japan

[ * ] Notice: The portion of the term of this patent subsequent to Feb. 11, 2003 has been disclaimed.

[21] Appl. No.: 857,398

[22] Filed: Apr. 21, 1986

Related U.S. Application Data

[63] Continuation of Ser. No. 615,755, May 31, 1984, abandoned.

[30] Foreign Application Priority Data

Jul. 8, 1983 [JP] Japan ................................ 58-123298

[51] Int. Cl.[4] .............................................. B60K 41/16
[52] U.S. Cl. ........................................ 74/866; 74/861; 74/865; 364/424.1
[58] Field of Search .................. 74/843, 856, 861, 862, 74/865, 866, 867; 364/424.1

[56] References Cited

U.S. PATENT DOCUMENTS

| | | | |
|---|---|---|---|
| 3,956,947 | 5/1976 | Leising et al. | 74/866 |
| 4,073,203 | 2/1978 | Wurst et al. | 74/866 |
| 4,080,850 | 3/1978 | Bubula et al. | 74/861 |
| 4,096,768 | 6/1978 | Miyao | 74/865 |
| 4,193,323 | 3/1980 | Bubula et al. | 74/861 X |
| 4,261,229 | 4/1981 | Mizuno et al. | 74/866 |
| 4,313,354 | 2/1982 | Iwanaga et al. | 74/861 X |
| 4,458,318 | 7/1984 | Smit et al. | 364/424.1 |
| 4,495,837 | 1/1985 | Morscheck | 74/867 X |
| 4,569,254 | 2/1986 | Itoh et al. | 74/866 |
| 4,590,561 | 5/1986 | Abo et al. | 364/424.1 |

FOREIGN PATENT DOCUMENTS 3144845 12/1982 Fed. Rep. of Germany ... 364/424.1

Primary Examiner—Leslie A. Braun
Assistant Examiner—Dwight G. Diehl
Attorney, Agent, or Firm—Oblon, Fisher, Spivak, McClelland & Maier

[57] ABSTRACT

In a continuously variable transmission (CVT), the desired engine speed is defined as a function of the throttle position. The speed ratio of the CVT is controlled such that the actual engine speed reaches the desired engine speed. The desired engine speed is set to B (Nos−Nos') upon the abrupt change in the throttle position, where B is a positive value less than 1, Nos is a desired steady-state engine speed after the change and Nos' is a desired steady-state engine speed before the change. Thereafter the desired engine speed approaches gradually the desired steady-state engine speed corresponding to the present throttle position. In the present invention the values of B in acceleration and deceleration of a vehicle are defined different from each other.

14 Claims, 5 Drawing Sheets

CONTROL SYSTEM FOR CONTINUOUSLY VARIABLE TRANSMISSION IN MOTOR VEHICLE

This application is a continuation of application Ser. No. 615,755, filed May 31, 1984, now abandoned.

BACKGROUND OF THE INVENTION

1. Field of the Invention

The present invention relates to a control system for a continuously variable transmission (CVT) in a motor vehicle.

2. Background of the Invention

A CVT is to control continuously speed ratio e (=output side rotational speed Nout/input side rotational speed Nin) to be used for a motor vehicle as a power transmission system with an excellent specific fuel consumption. In this CVT, the horsepower requirement is set as a function of throttle position $\theta$, and the engine speed Ne meeting each horsepower requirement with the minimum fuel consumption is defined as the desired steady-state engine speed in the throttle position $\theta$. In the prior art CVT, the desired engine speed is not particularly set in a transient time, but equalized to the desired steady-state engine speed. In this case it takes time until the actual engine speed reaches the desired steady-state engine speed and inconvenience was found in slow responsive property in the transient time. Thus, the assignee of the present application proposed a control system for the CVT in the prior patent application Sho No. 58-17550 filed in the Japanese Patent Office on February, 1983 so as to eliminate such inconvenience. According to this control system, the desired engine speed is set as a function of the throttle position and the engine speed or the speed ratio of the CVT is controlled such that the actual engine speed reaches the desired engine speed. Rate of step change B is defined as a positive number less than 1. When the throttle position changes substantially, the desired engine speed is discretely changed by the product B·(Nos−Nos') of a difference Nos−Nos' between the desired steady-state engine speed Nos after the change in the throttle position and the desired steady-state engine speed Nos' before the change in the throttle position and the rate of step change B. Then, the desired engine speed is gradually changed toward the desired steady-state engine speed Nos after the change in the throttle position. Namely, since the desired engine speed in the transient time is smoothly increased, the engine speed ne is speedily increased to smooth the acceleration. However, the rate of step change B to ensure a predetermined responsive property is set by this control system without distinguishing acceleration time from deceleration time so that both drivability and drive feeling were difficult to optimize both in the acceleration time and deceleration time. Namely, when a driver requests large acceleration by pedalling hard the accelerator pedal it is necessary to rapidly increase the engine speed and give large output shaft torque to the vehicle to ensure the satisfactory drivability. But, the driver does not necessarily need an abrupt speed change when he returns largely the accelerator pedal to the intial position. In the latter case, the drive feeling is improved when not only the output torque of the engine, but also the drive torque including inertial torque of the engine and CVT are smoothly changed.

SUMMARY OF THE INVENTION

An object of the present invention is to provide a control system for a CVT in motor vehicle from which are obtained an excellent drivability and drive feeling both in acceleration time and deceleration time.

According to the control system for the CVT in motor vehicle according to the present invention to achieve this object, the rate of step change B is set to different values in the acceleration time and deceleration time.

As a result, the rate of step change B optimized for each case of the acceleration time and deceleration time is to be set so that the excellent drivability and drive feeling are to be provided both in the acceleration time and deceleration time.

Preferably the rate of step change B is set to a large volume in the acceleration time to obtain large transient responsive property and set to a small value in the deceleration time to smooth the change in the drive torque.

The acceleration and deceleration are detected by the throttle position $\theta$ or comparison of the desired steady-state engine speed Nos' before the change in the throttle position with that Nos after same.

Other objects and advantages of the present invention will become apparent from the following description taken in conjunction with the accompanying drawings.

DESCRIPTION OF THE PREFERRED EMBODIMENTS

Figure 1:
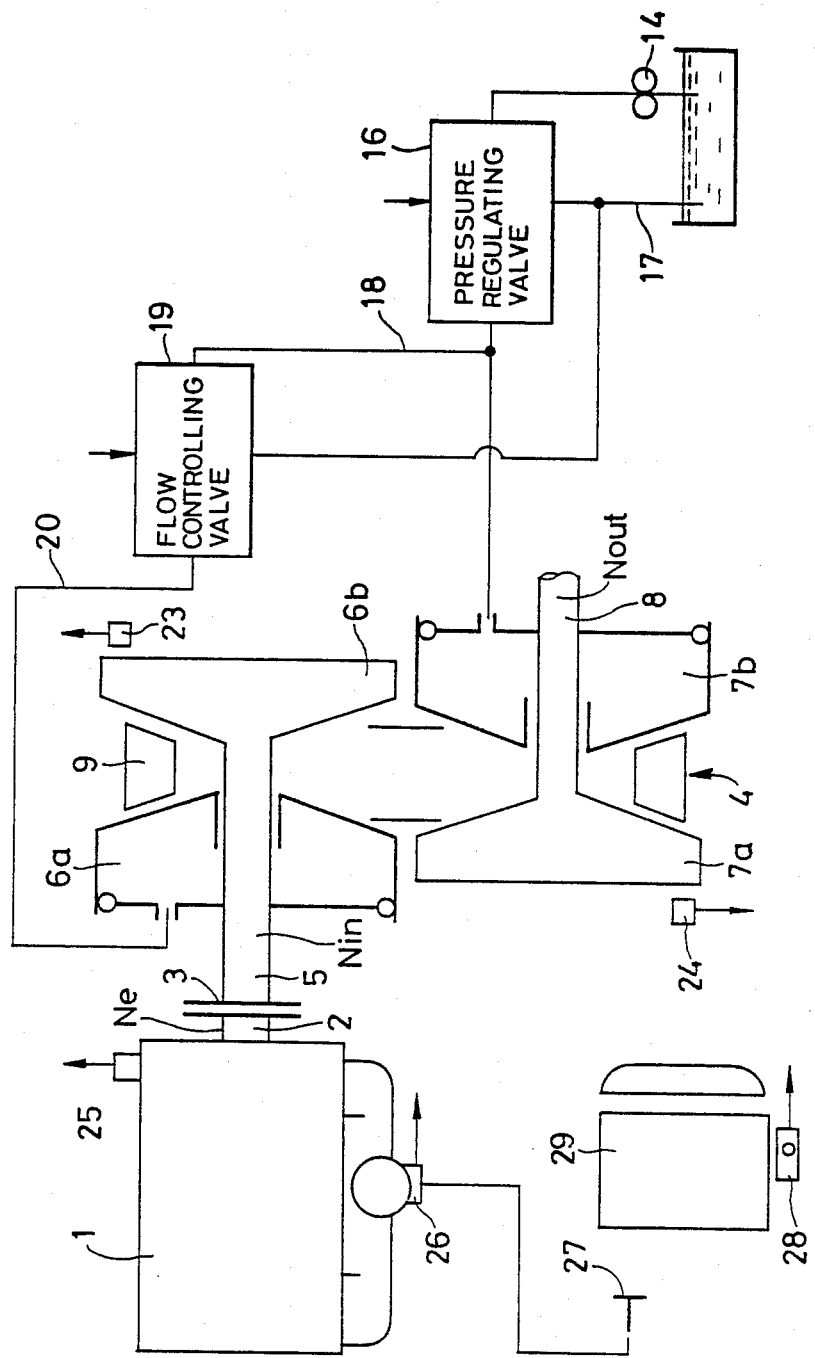
FIG. 1 is a schematic view showing the whole CVT according to the present invention.

In FIG. 1, a crankshaft 2 of an engine 1 is connected to an input shaft 5 of a CVT 4 through a clutch 3. A pair of input side disks 6a, 6b are provided opposed to each other, one input side disk 6a being mounted on the input shaft 5 axially movably and the other input side disk 6b being fixed to the input shaft 5. Also, a pair of output side disks 7a, 7b are provided opposed to each other, one output side disk 7a being fixed to an output shaft 8 and the other output side disk 7b being mounted on the output shaft 8 axially movably. A belt 9 having an equilateral trapezoidal cross-section is trained over the input side disks 6a, 6b and the output side disks 7a, 7b. Opposed surfaces of the input and output side disks 6a, 6b and 7a, 7b are formed to have a tapered section such that the distance between both surfaces increases as they extend radially outward. The engaging radii of the belt 9 trained over the input and output side disks 6a, 6b and 7a, 7b increase or decrease in relation to the increase or decrease of the distance between the opposed surfaces to change the speed ratio and transmission torque. An oil pump 14 supplies oil sucked from an oil reservoir 15 to a pressure regulating valve 16. The linear solenoid system pressure regulating valve 16 controls oil amount ejected to a drain 17 to control line pressure in an oil path 18. The oil path 18 is connected to a hydraulic cylinder of the output side disk 7b. A linear solenoid system flow controlling valve 19, when increasing the press force between the input side disks 6a, 6b to increase the speed ratio e(=rotational speed Nout of the output side disks 7a, 7b/rotational speed Nin of the input side disks 6a, 6b, provided Nin=engine speed Ne), increases the sectional area of flow between an oil path 20 to a hydraulic cylinder of the input side disk 6a and the oil path 18 while shutting off communication between the oil path 20 and the drain 17, and when decreasing the press force between the input side disks 6a, 6b to decrease the speed ratio, shuts off the communication between the oil paths 18 and 20 while controlling the sectional area of flow between the oil path 20 and the drain 17. Rotational angle sensors 23, 24 detect respectively the rotational speeds Nin, Nout of the input and output side disks 6b and 7a. The cylinder oil pressure in the output side disk 7b, i.e. line pressure is controlled to the minimum oil pressure to ensure torque transmission without slippage of the belt 9 so that the drive loss of the pump 14 is restrained. The speed ratio of the CVT 4 is controlled according to an oil flow to the input side disk 6a. Further, while the cylinder oil pressure in the output side disk 7b is equal to or higher than the cylinder oil pressure in the input side disk 6a, the pressure receiving area of a cylinder piston at the input side > that at the output side and the speed ratio more than 1 is to be realized. A water temperature sensor 25 detects the cooling water temperature of the engine 1. A throttle position sensor 26 detects the opening of an intake system throttle valve connected to an accelerator pedal 27. A shift position sensor 28 detects the range of a shift lever near a seat 29.

Figure 2:
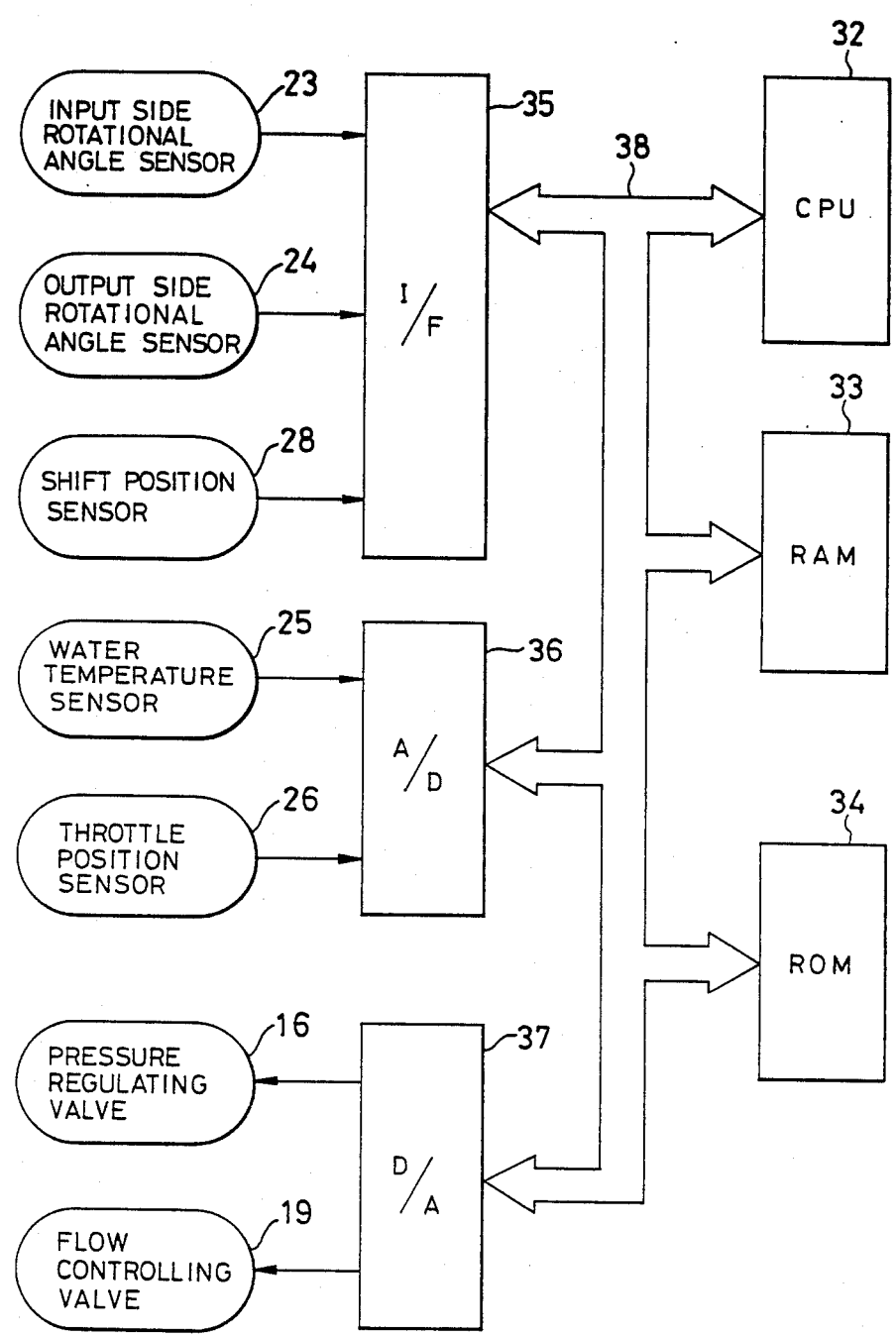
FIG. 2 is a block diagram of an electronic control system.

FIG. 2 is a block diagram of an electronic control system. CPU 32, RAM 33, ROM 34, I/F(interface) 35, A/D (analog/digital converter) 36 and D/A(digital-/analog converter) 37 are connected to each other through a bus 38. The output pulses of the rotational angle sensors 23, 24 and the shift position sensor 28 are supplied to the interface 35 and the analog outputs of the water temperature sensor 25, and the throttle position sensor 26 are supplied to A/D 36 and the output of D/A 37 to the pressure regulating valve 16 and the flow controlling valve 19.

Referring schematically to the principle for controlling the CVT 4, the horsepower requirement for the internal combustion engine 1 is defined as a function of the intake system throttle position $\theta$ and the engine speed satisfying the horsepower requirement with the minimum fuel consumption is defined as the desired steady-state engine speed Nos(=the desired steady-state input side rotational speed Nins). Hence, the desired steady-state engine speed is a function of the throttle position $\theta$. Also, the desired steady-state speed ratio es is Nout/Nins, provided Nout is the actual output side rotational speed of the CVT 4. In the CVT 4 during the steady period, the flow controlling valve 19 is controlled such that the input side rotational speed Nin or speed ratio e provides the desired steady-state input side rotational speed Nins or desired steady-state speed ratio es.

Figure 3:
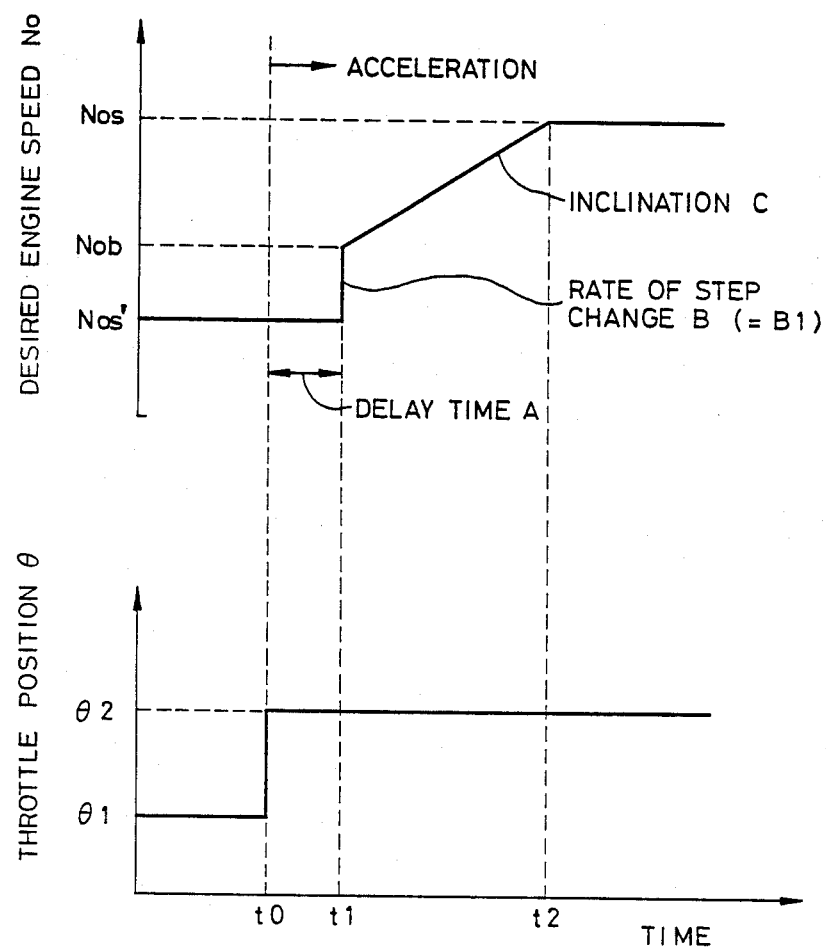
FIG. 3 is a diagram showing the change in desired engine speed in the present invention when a throttle position is largely increased in the acceleration time.
Figure 4:
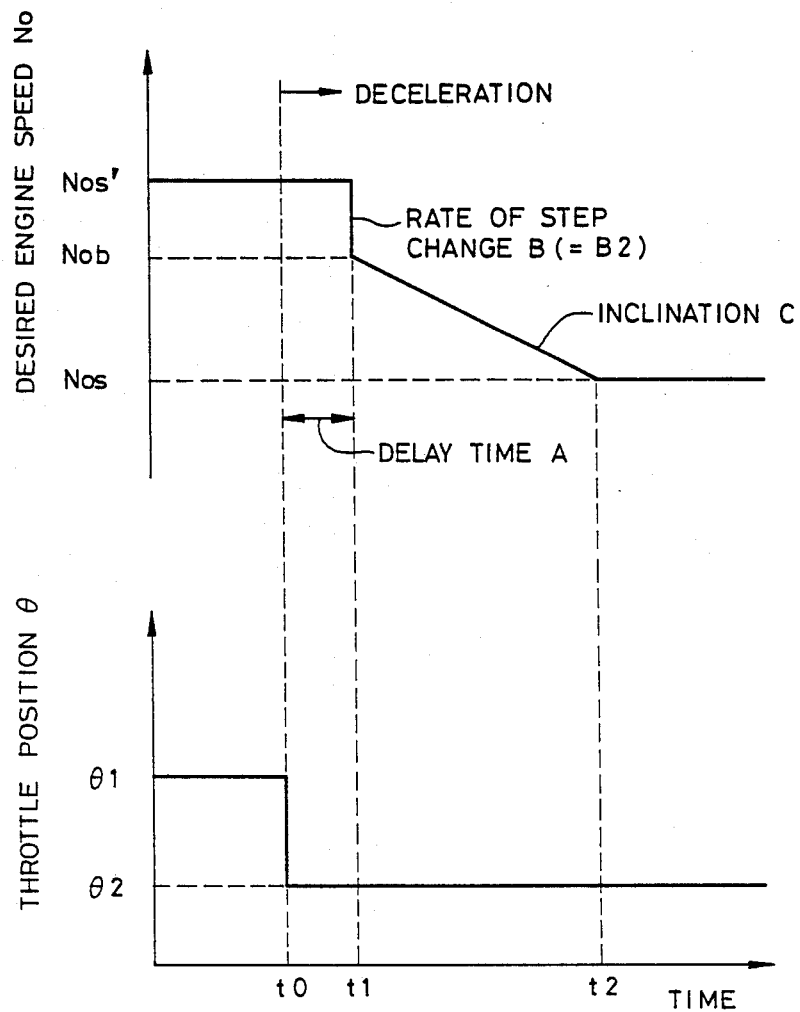
FIG. 4 is a diagram showing the change in the desired engine speed in the present invention when the throttle position is substantially decreased in the deceleration time.

FIGS. 3 and 4 show changes in the desired engine speed No when the throttle position $\theta$ is largely increased(acceleration time) and decreased (deceleration time). When the throttle position $\theta$ at time to is largely increased or decreased from $\theta 1$ to $\theta 2$, the desired engine speed No is held at the desired steady-state engine speed or actual engine speed Nos' corresponding to the throttle position $\theta 1$ until the delay time A elapses to time t1 and then increases or decreases discretely by an engine speed corresponding to a rate of step change B at the time t1, to provide an intermediate or transient speed value Nob and after the time t1 gradually increases or decreases with an inclination C toward the desired steady-state engine speed Nos' in the throttle position $\theta 2$. Further, the rate of step change B is defined as a positive number less than 1 by the following formula:

$$B = Nob/Nos - Nos'.$$

The delay time A from time t0 to t1 is set to confirm the real intension of a driver for the requirement of acceleration or deceleration, and when the driver returns the pedalling amount of the acclerator pedal 27 to the initial one within the delay time A, the transient control of the CVT 4 is not carried out. The step change of the desired engine speed No caused by the rate of step change B is carried out to ensure a predetermined responsive property in the transient time. The increase or decrease of the desired engine speed No in the inclination C moderates the change in the desired engine speed No to shift speedily and smoothly the actual engine speed Ne to Nos.

According to the present invention, such rates of step change B are set separately in the acceleration time and deceleration time, i.e. to the optimum value respectively in the acceleration time and deceleration time to provide an excellent drivability and drive feeling in both acceleration time and deceleration time. The rate of step change B(=B1) is set to a large value to ensure large output shaft torque in the acceleration time and the rate of step change B(=B2) is set to a comparatively small value to give satisfactory drive feeling through a smooth change in the drive torque in the deceleration time.

Figure 5:
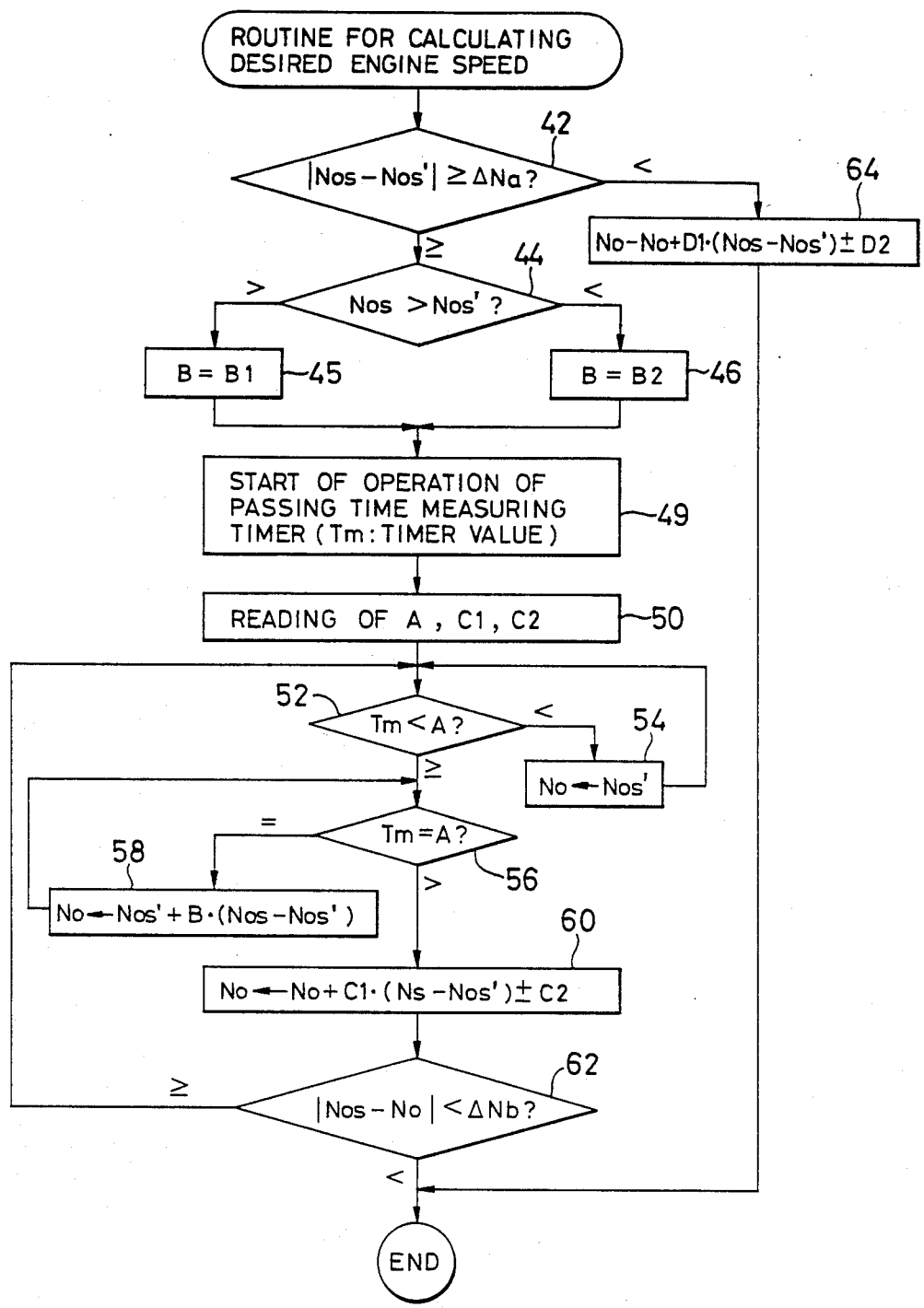
FIG. 5 is a flow chart of a routine for calculating the desired engine speed.

FIG. 5 is a flow chart of a routine for calculating the desired engine speed No. In the acceleration or deceleration time when the throttle position $\theta$ is largely increased or decreased, the desired engine speed is calculated according to the graph in FIGS. 3 and 4. Namely, in the acceleration time is set the rate of step change B to B1 and in the deceleration time is set the rate of step change B to B2(provided 0<B2<B1<1). Also, in both transient and steady times when the change in the throttle position $\theta$ is small is calculated the desired engine speed No from the following formula:

$$No = Nos' + D1 \cdot (Nos - Nos') \pm D2$$

where D1, D2 are constants, and $$D1 \cdot (Nos - Nos') \pm D2 \simeq (1/100) \cdot (Nos - Nos').$$

Namely, the variation of the desired engine speed is restrained in the transient and steady times when the change in the throttle position $\theta$ is small. Referring to respective steps in detail, whether or not absolute value $|Nos - Nos'|$ of a difference between the desired steady-state engine speed Nos corresponding to the throttle position $\theta$ after the change in the position and the desired steady-state engine speed Nos' corresponding to the throttle position $\theta$ before the change in the position is more than a predetermined value $\Delta Na$ is judged in step 42. Step 42 is followed by step 44 when $|Nos-Nos'| \geq \Delta Na$, i.e. the throttle position $\theta$ is largely changed, or followed by step 64 when $|Nos-Nos'| < \Delta Na$, i.e. the change in the throttle position $\theta$ is small. In step 44 is compared the desired steady-state engine speed Nos after the change in the throttle position with the desired steady-state engine speed Nos' before the change in the throttle position. Step 44 is followed by step 45 if Nos>Nos', i.e. in the acceleration time, or by step 46 if Nos<Nos' i.e. in the deceleration time respectively. In step 45 is substituted the predetermined value B1 for the rate of step change B and in step 46 is substituted the predetermined value B2 for the rate of step change B, provided $0<B2<B1<1$. In step 49 is started the operation of a passing time measuring timer. In step 50 is read A, C1 and C2 from the memory, provided C1, C2 are constants, and C1·(Nos−Nos')±C2 is equal to the inclination C in FIG. 3. In step 52 is compared the value Tm of the passing time measuring timer with A. and advance is followed by step 54 if Tm<A or by step 56 if Tm≧A. In step 54 is substituted Nos' for the desired engine speed No and the control returns to step 52. In step 56 is compared the value Tm of the passing time measuring timer with the predetermined value A, step 56 is followed by step 58 if Tm=A or by step 60 if Tm>A. In step 58 is substituted Nos'+B·(Nos−Nos') for the desired engine speed No. That is, the desired engine speed No is changed to the intermediate or transient speed Nb (FIGS. 3 and 4). The control then returns to step 56. In step 60 is increased the desired engine speed No by C1·(Nos−Nos')±C2. In step 62 is compared |Nos−No| with a predetermined value $\Delta Nb$ and step 62 is followed by step 52 if $|Nos-No| \geq \Delta Nb$, i.e. the present desired engine speed No is different from the desired steady-state engine speed Nos corresponding to the throttle position $\theta$ after the change in the position, by more than $\Delta Nb$. If $|Nos-No| < \Delta Nb$, i.e. No approaches sufficiently Nos, the routine is completed. In step 64, No+D1·(Nos−Nos')±D2 is substituted for the desired speed No.

Although the present invention has been described with respect to specific details of certain embodiments thereof, it is not intended that such details be limitation upon the scope of the invention expect insofar as set forth in the following claims.

What is claimed is:

1. A method for controlling a speed of an engine in a motor vehicle using a continuously variable transmission, the transmission having a driving pulley comprising a fixed member and a movable member, the movable member being actuated by a hydraulic cylinder to form a V-shaped opening between the movable member and the fixed member, a driven pulley with another fixed member and another movable member, said another movable member being similarly actuated by another hydraulic cylinder to form a similar V-shaped opening between said another movable member and said another fixed member, and a flexible belt member spanning the pulleys so that the diameters of the pulleys can be varied with regard to each other with the movable members of the driving and driven pulleys being moved by the respective hydraulic cylinder, whereby different speed ratios can be obtained, the method comprising the steps of:

detecting a change in a throttle position in throttle means on the engine;

detecting an actual engine speed at a point immediately after said change occurs in the throttle position in the throttle means;

determining a desired steady state engine speed corresponding to a newly established throttle position established by said change;

determining an intermediate engine speed as a desired engine speed in a transient shifting condition of the continuously variable transmission which is established by said change in the throttle position, said intermediate engine speed used during acceleration of the vehicle being different in value from that used during deceleration of the vehicle, and being intermediate in value between the determined desired steady state engine speed and the detected actual engine speed;

changing the actual engine speed to said intermediate engine speed; and gradually changing the actual engine speed from the intermediate engine speed to said determined desired steady state engine speed corresponding to said newly established throttle position.

2. The method of claim 1, further comprising a step of:

maintaining the detected actual engine speed for said predetermined time.

3. A method for controlling a speed of an engine in a motor vehicle using a continuously variable transmission, the transmission having a driving pulley comprising a fixed member and a movable member, the movable member being actuated by a hydraulic cylinder to form a V-shaped opening between the movable member and the fixed member, a driven pulley with another fixed member and another movable member, said another movable member being similarly actuated by another hydraulic cylinder to form a similar V-shaped opening between said another movable member and said another fixed member, and a flexible belt member spanning the pulleys so that the diameters of the pulleys can be varied with regard to each other with the movable members of the driving and driven pulleys being moved by the respective hydraulic cylinders, whereby different speed ratios can be obtained, the method comprising the steps of:

detecting a change in a throttle position in throttle means on the engine;

determining a desired steady state engine speed corresponding to a newly established throttle position established by said change;

detecting an actual engine speed at a point immediately after said change occurs in the throttle position in the throttle means;

calculating a magnitude of a difference between the determined desired steady state engine speed and the detected actual engine speed;

determining whether the calculated magnitude of said difference exceeds a predetermined value, or not;

if said calculated magnitude exceeds said predetermined value, determining an intermediate engine speed as a desired engine speed in a transient shifting condition of said transmission, said intermediate engine speed being intermediate between the determined desired steady state engine speed and the detected actual engine speed, said intermediate engine speed used during acceleration of the vehicle being different from that used during deceleration of the vehicle; and changing the actual engine speed to the determined intermediate engine speed, upon elapse of a predetermined time after said change in the throttle position occurrs.

4. The method of claim 3, further comprising a step of:
gradually changing the actual engine speed from said determined intermediate engine speed to the determined desired steady state engine speed.

5. The method of claim 4, wherein the intermediate engine speed changes linearly from the intermediate engine speed to the steady state engine speed.

6. The method of claim 4, further comprising a step of:
maintaining the detecting actual engine speed for said predetermined time.

7. The method of claim 3, further comprising a step of:
maintaining the detected actual engine speed for said predetermined time.

8. The method of claim 3, further comprising a step of:
if said magnitude of said difference between the determined desired steady state engine speed and the detected actual engine speed is less than said predetermined value, changing the actual engine speed at a rate lower than that when said magnitude of the difference exceeds said predetermined value.

9. A method for controlling a speed of an engine in a motor vehicle using a continuously variable transmission, the transmission having a driving pulley comprising a fixed member and a movable member, the movable member being actuated by a hydraulic cylinder to form a V-shaped opening between the movable member and the fixed member, a driven pulley with another fixed member and another movable member, said another movable member being similarly actuated by another hydraulic cylinder to form a similar V-shaped opening between said another movable member and said another fixed member, a flexible belt member spanning the pulleys, and electronic control means, the electronic control means including memory means for storing a relationship between a desired engine speed and a throttle position, said electronic control means controlling pressures in the hydraulic cylinders so as to provide an optimal desired engine speed of the engine, the method comprising the steps of:
detecting a change in a throttle position in throttle means provided on said engine, from a first throttle position to a second throttle position;
determining a first desired steady state engine speed corresponding to said first throttle position, and a second desired steady state engine speed corresponding to said second throttle position, said first and second steady state engine speeds being determined from said first and second throttle positions, respectively, in accordance with said relationship stored in said memory means;
calculating a difference between said first and second desired steady state engine speeds;
comparing said difference with a predetermined value;
determining a transient value as a desired engine speed in a transient condition of the transmission, said transient value being intermediate between said first and second desired engine speed, said transient value during acceleration of the vehicle being different from that used during deceleration of the vehocle; and
changing an actual engine speed of the engine in accordance with said comparison, such that when said difference is smaller than said predetermined value, said actual engine speed is changed to approach said second desired engine speed gradually at a rate lower than that when said difference is larger than said predetermined value, and such that when said difference is larger than said predetermined value, said actual engine speed is rapidly changed to said transient value, and is then gradually changed from the determined transient value to approach said second desired engine speed.

10. The method of claim 9, where the second desired steady state engine speed is substantially equal to the first desired engine speed, when said difference is smaller than said predetermined value.

11. The method of claim 10, wherein said transient value is larger than said first desired steady state engine speed and is smaller than said second desired steady state engine speed when the throttle position is changed for acceleration of the vehicle.

12. The method of claim 11, wherein said actual engine speed is held at said first desired steady state engine speed for a predetermined period of time after commencement of said change in said throttle position.

13. The method of claim 11, wherein said actual engine speed is linearly changed to said second desired steady state engine speed from said transient value.

14. The method of claim 11, further comprising the step of maintaining the actual engine speed at said first desired steady state engine speed for a predetermined period of time after commencement of the change in the throttle position.

* * * * *